June 12, 1962 F. J. BEATRICE 3,038,762
PHASE SENSITIVE DEMODULATOR ACTUATED ONLY WHEN INPUT SIGNAL IS ABOVE SET THRESHOLD LEVEL
Filed Nov. 18, 1960
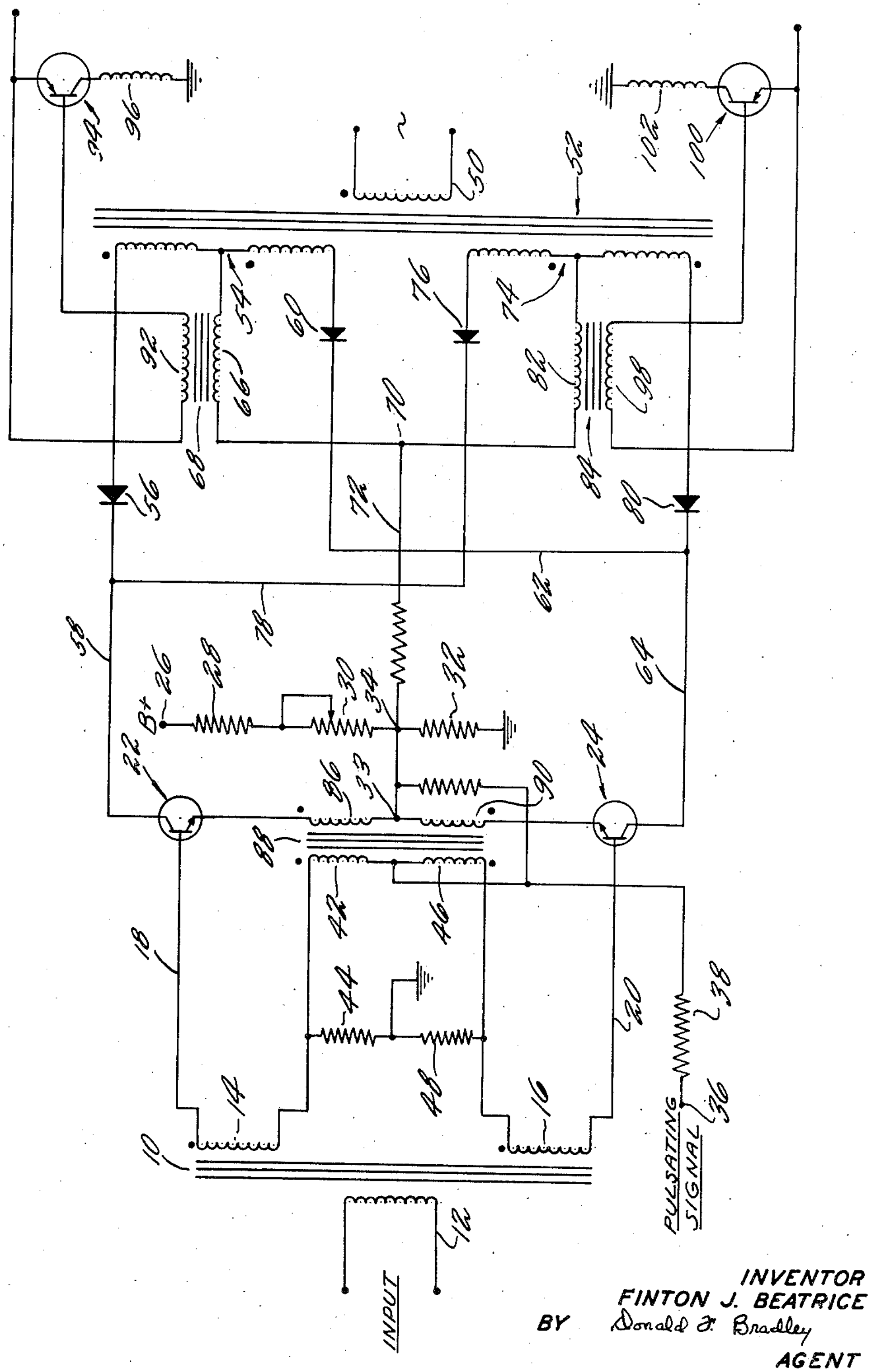
INVENTOR
FINTON J. BEATRICE
BY Donald F. Bradley
AGENT United States Patent Office 3,038,762
Patented June 12, 1962

3,038,762

PHASE SENSITIVE DEMODULATOR ACTUATED ONLY WHEN INPUT SIGNAL IS ABOVE SET THRESHOLD LEVEL

Finton J. Beatrice, Broad Brook, Conn., assignor to United Aircraft Corporation, East Hartford, Conn., a corporation of Delaware Filed Nov. 18, 1960, Ser. No. 70,287
7 Claims. (Cl. 307—88.5)

This invention relates to a demodulator circuit and particularly to a circuit which is phase sensitive and is responsive only to input signals above a preselected magnitude.

There are many occasions, particularly in electronic control systems, where it is advantageous to provide a different output signal when an input signal, which may indicate an error in some portion of the control system, reaches a certain magnitude. For example, it may be desired to reposition a controlled element slowly when the error is small, but, when a larger error occurs, to provide a much faster repositioning signal by actuating additional circuitry. The demodulator circuit of this invention will respond only to an error signal above a particular predetermined value, and thus may be used to assume command under chosen conditions.

An advantageous feature of this invention is a controllable dead band by which it is possible to vary the magnitude of the voltage at which the demodulator circuit will become activated. A further important feature of this invention is the fact that the demodulator circuit is phase sensitive, and will produce an output signal which is a function of the phase of the input error signal. As an additional feature, the demodulator circuit may be modified to produce either a half-wave or full-wave output signal.

Once the demodulator circuit of this invention has been actuated, a positive feedback is employed to increase the response of the circuit and provide a rapid turn-on time.

By connecting an independent pulsating input signal to the circuit, it is possible to produce a pulsating output signal having a duration determined by the pulse width of the pulsating input signal and thereby vary the duty cycle of the system.

It is therefore an object of this invention to provide a phase-sensitive demodulator circuit which will be actuated only when the input signal is above a predetermined value.

Another object of this invention is a demodulator circuit which has an adjustable dead band whereby the voltage of the input signal necessary to activate the circuit may be varied.

A further object of this invention is a phase-sensitive demodulator circuit which has a fast response.

Another object of this invention is a phase-sensitive demodulator circuit which will produce a pulsating output signal having a variable duty cycle.

These and other objects and a fuller understanding of the invention may be had by referring to the following description and claims, taken in conjunction with the accompanying drawing, in which the FIGURE shows a schematic representation of the invention.

Referring now to the figure, an alternating current input signal of, for example, 400 cycles and having an amplitude which may be indicative of the deviation of an element from a preselected value, is applied to transformer 10 through primary winuding 12. Secondary windings 14 and 16 of the transformer 10 are connected through lines 18 and 20 to the base junctions of NPN transistors 22 and 24. Assuming that the input to the circuit is initially positive, as shown by the transformer polarities in the figure, transistor 22 will be positive and conditioned to conduct, while the base of transistor 24 will be negative and transistor 24 will be in a non-conducting state.

A source of positive D.C. voltage 26 supplies a positive bias to the junction 33 of the emitters of transistors 22 and 24. The source of voltage 26 will, through resistor 28, adjustable resistor 30, and resistor 32, produce a positive bias at junction 34 which will be, for purposes of illustration, about +2 volts above ground. Assuming that the input signal across windings 16 and 14 is approximately +1 volt, it can be seen that because of the biasing voltage at junction 33 the emitter-base junctions of both transistors 22 and 24 will be reverse biased and the transistors will be nonconducting at this time.

A pulsating signal which may be varied to the desired duty cycle is applied to the demodulator circuit at junction 36. This pulsating signal will normally have a pulse repetition rate which is much lower than the carrier frequency of the error signal applied through transformer winding 12, and for purposes of illustration may have a frequency of one pulse in four seconds with the positive pulse remaining for one-half second. The pulsating input signal has a path to ground through resistor 38, junction 40, transformer winding 42, and resistor 44, and also through resistor 38, junction 40, transformer winding 46, and resistor 48. Since winding 42 has a very low D.C. impedance, practically all the voltage drop will be across resistor 44 thus raising the level of the signal across winding 14 to a higher positive value. If the pulsating input signal at junction 36 is selected to cause a drop of 2 volts, for example, across winding 44, the base junction of transistor 22 will now be at a potential of +3 volts. Since the emitter junction of transistor 22 is biased to +2 volts, and the base junction is biased to +3 volts, transistor 22 will be turned on.

At the same time that transistor 22 is biased to a conductive state, the base of transistor 24 is at a negative potential with respect to is emitter, and is therefore nonconductive.

An alternating voltage of fixed amplitude and which is either in phase with or 180° out of phase with the input signal is connected to the demodulator circuit through primary winding 50 of transformer 52. Center-tapped secondary winding 54 of transformer 52 is connected at one end through diode 56 and a line 58 to the collector junction of the transistor 22, and at its other end is connected through diode 60, line 62, and line 64, to the collector junction of transistor 24. The center tap from secondary winding 54 is connected through the primary winding 66 of a transformer 68 and through junction 70 and line 72 to the junction 33 of the emitters of transistors 22 and 24.

Another center-tapped secondary winding 74 of transformer 52 is connected at one end through diodes 76 and lines 78 and 58 to the collector junction of transistor 22. The other end of secondary winding 74 is connected through diode 80 and line 64 to the collector junction of transistor 24. The center tap from secondary transformer winding 74 is connected through the primary winding 82 of transformer 84 to junction 70 and through line 72 to the emitter junction 33 of transistors 22 and 24.

Assuming that the polarity of the alternating signal applied to winding 50 is as shown in the figure, and is thus in phase with the input signal, the collector of transistor 22 will be at a positive potential and the transistor will conduct with the current flow from the transistor emitter through winding 86 of transformer 88, through junction 33, line 72, junction 70, winding 66, the top portion of winding 54, diode 56, and line 58, back to the collector of transistor 22.

During the next half cycle, the polarity of the voltages will change and transistor 24 will be rendered conductive while transistor 22 will be cut off. Because the alternating voltage applied through transformer winding 50 is of the same frequency as and in phase with the input signal, the polarities of the voltages across secondary windings 54 and 74 will have reversed by 180°. Transistor 24 will, therefore, conduct through winding 90 of transformer 88, junction 33, line 72, primary winding 66 of transformer 68, the bottom portion of secondary winding 54, diode 60, line 62, and line 64, back to the collector junction of transistor 24.

It should be noted here that in this case, that is where the alternating signal and the input signal are in phase, the direction of current flow through primary winding 66 of transformer 68 is in the same direction whether the current be supplied from transistor 22 or from transistor 24. If the secondary winding 92 of transformer 68 is connected as shown across the emitter and base of the PNP transistor 94, the transistor 94 will conduct during both cycles of the input signal and will provide a full-wave output across the load 96 connected between the collector of transistor 94 and ground.

If the alternating voltage across transformer primary winding 50 is 180° out of phase with the input signal across winding 12, the current flow during conduction of transistor 22 will be through winding 86, line 72, winding 82, the top portion of secondary winding 74, diode 76, line 78, and line 58, back to transistor 22. During the half cycle when transistor 24 is conducting, the current flow will be through winding 90, line 72, winding 82, the bottom portion of secondary winding 74, diode 80, and line 64, back to transistor 24. Again in this case, the flow through winding 82 is in the same direction during conduction of both transistors 22 and 24. If secondary winding 98 of transformer 84 is connected across the emitter and base of PNP transistor 100, transistor 100 will conduct during both half cycles of the input signal and a full-wave output will result across load 102.

It can thus be seen that when the alternating voltage across winding 50 is in phase with the input signal, a full-wave output will result across transformer 68 which is shown connected to a transistor 94 and load 96. When the alternating voltage across winding 50 is 180° out of phase with the input signal, a full-wave output results across transformer 84 which is shown connected to transistor 100 and load 102.

The circuit of this invention need not be used as a full-wave demodulator but may be designed to be used as a half-wave demodulator by utilizing only one center tapped secondary winding from transformer 52 and connecting the center tap through an output transformer to the junction of the transistor emitters.

One of the novel features of this invention is the rapid turn-on time of the transistors. When, for example, transistor 22 is first turned on, current will flow through winding 86 with a polarity as shown. Secondary winding 42 of the transformer 88 will thereupon have a voltage generated across it which will raise the voltage level across winding 14 and result in a more positive potential at the base junction of transistor 22. The more positive base will cause transistor 22 to conduct harder, resulting in a further increase in current across winding 86 and a further rise in the potential across winding 14. Transistor 22 will thus saturate very rapidly because of the regenerative feedback. The same action takes place with transistor 24 where windings 90 and 46 generate the feedback signal.

One of the most useful features of this invention is the variable emitter bias applied to transistors 22 and 24. By adjusting rheostat 30, the positive bias at junction 33 can be adjusted, and this will result in a different input signal voltage being required before transistors 22 and 24 will conduct. This feature results in an adjustable dead band of voltages at which the demodulator will not become activated. For example, if rheostat 30 were adjusted to impress a potential of +4 volts at the emitters of transistors 22 and 24, and assuming that the pulsating signal applied at junction 36 remains at +2 volts maximum, the input signal across winding 12 would be required to reach +3 volts before transistors 22 and 24 would conduct. During the application of the pulsating signal, the base junction of the transistors would have to be at least one volt above the emitter potential before the transistor would conduct.

The pulsating signal applied to the circuit at junction 36 is not an absolute necessity for operation of the circuit. If no particular duty cycle is desired, the pulsating signal could be eliminated and the transistors would conduct as previously described but the input signal would be required to be at a higher positive potential before the transistors would be rendered conductive.

It is obvious that windings 66 and 82 of transformers 68 and 84 may be replaced by other elements as the load on the circuit.

Although the invention has been described in its preferred form with a certain degree of particularity, it is understood that the present disclosure of the preferred form has been made only by way of example and that numerous changes in the details of construction and the combination and arrangements of parts may be resorted to without departing from the spirit and the scope of the invention as hereinafter claimed:

I claim:

1. A phase sensitive demodulator circuit comprising transistor means, a source of signal input connected to said transistor means, biasing means connected to oppose actuation of said transistor means, a timing signal connected to act in conjunction with said source of signal input for overcoming said biasing means and actuating said transistor means when said signal input is above a predetermined magnitude, output circuit means for producing an output signal upon actuation of said transistor means and including gating means for selectively directing the current from said transistor means to first and second output circuits, and alternating signal means for actuating said gating means as a function of the phase relationship between said alternating signal means and said signal input.

2. A demodulator circuit as in claim 1 and including feedback means connected with said transistor means to provide a feedback signal aiding said signal input and thereby increasing the time responsiveness of said transistor means.

3. A demodulator circuit as in claim 1 where said gating means includes diodes.

4. A demodulator circuit as in claim 1 where said biasing means may be varied to thereby change the magnitude of said signal input necessary to actuate said transistor means.

5. A phase sensitive demodulator circuit comprising a source of variable amplitude alternating input signals, a pair of transistors, means to supply a biasing signal for biasing said transistors to a nonconductive state, a pulsating timing signal connected with said input signal source for rendering said transistors conductive during the occurrence of said timing signal when said input signal has a magnitude sufficient to overcome said biasing signal, feedback means connecting said transistors with said input signal source for increasing the time response of said transistors when said transistors are rendered conductive, first and second output circuits each connected across both said transistors including rectifier means connected between each of said output circuits and said transistors, and alternating signal means of the same frequency as said input signal for directing the current flow from said transistors to said first output circuit when said alternating signal is in phase with said input signal, and directing the current flow from said transistors to said second output circuit when said alternating signal is 180° out of phase with said input signal.

6. A demodulator circuit as in claim 5 where said biasing signal is adjustable to thereby vary the magnitude of said input signal necessary to render said transistors conductive.

7. A phase sensitive demodulator circuit comprising a source of variable amplitude alternating input signals, coupling means connecting said input signals to first and second transistors, an adjustable biasing signal for biasing both said transistors to a nonconductive state, a pulsating timing signal connected with said coupling means whereby said first and second transistors are rendered alternately conductive during the occurrence of said timing signal when said input signals have a magnitude sufficient to overcome said biasing signal, an output circuit including first and second output transformers, means including series diodes for connecting each of said output transformers across each of said transistors, and means including an alternating signal of the same frequency as said input signal for selectively directing the current from said transistors to the selected output transformer, the current from both said first and second transistors being directed to said first output transformer when said alternating signal is in phase with said input signal, and the current from both said first and second transistors being directed to said second output transformer when said alternating signal is 180° out of phase with said input signal.

No references cited.